United States Patent
Nozaki et al.

(10) Patent No.: US 9,764,268 B2
(45) Date of Patent: Sep. 19, 2017

(54) GAS PURIFICATION FILTER UNIT

(71) Applicant: Entegris, Inc., Billerica, MA (US)

(72) Inventors: Fumio Nozaki, Tokyo (JP); Yutaka Shimada, Tokyo (JP)

(73) Assignee: Entegris, Inc., Billerica, MA (US)

( * ) Notice: Subject to any disclaimer, the term of this patent is extended or adjusted under 35 U.S.C. 154(b) by 92 days.

(21) Appl. No.: 14/651,824

(22) PCT Filed: Dec. 9, 2013

(86) PCT No.: PCT/JP2013/082961
§ 371 (c)(1),
(2) Date: Jun. 12, 2015

(87) PCT Pub. No.: WO2014/092046
PCT Pub. Date: Jun. 19, 2014

(65) Prior Publication Data
US 2015/0298040 A1    Oct. 22, 2015

(30) Foreign Application Priority Data
Dec. 14, 2012  (JP) ................. 2012-273367

(51) Int. Cl.
*B01D 53/02* (2006.01)
*B01D 46/00* (2006.01)
(Continued)

(52) U.S. Cl.
CPC ..... *B01D 46/0036* (2013.01); *B01D 46/0002* (2013.01); *B01D 46/521* (2013.01);
(Continued)

(58) Field of Classification Search
CPC ........ B01D 2253/104; B01D 2253/406; B01D 2253/108; B01D 2253/1085;
(Continued)

(56) References Cited

U.S. PATENT DOCUMENTS

| | | | |
|---|---|---|---|
| 4,559,066 A | 12/1985 | Hunter et al. | |
| 6,340,381 B1 | 1/2002 | Fujii et al. | |

(Continued)

FOREIGN PATENT DOCUMENTS

| | | |
|---|---|---|
| CN | 1997437 A | 7/2007 |
| CN | 101878183 A | 11/2010 |

(Continued)

OTHER PUBLICATIONS

International Search Report issued in International Application No. PCT/JP2013/082961, Date of Search: Mar. 3, 2014.

(Continued)

*Primary Examiner* — Christopher P Jones

(57) ABSTRACT

This gas purification filter unit (10) is provided with: a first elimination unit (11) that eliminates gas component impurities among the impurities contained in ozone generated from an ozone generating device; and a second elimination unit (12) that is disposed at a later stage than the first elimination unit and that further eliminates solid particulate impurities from among the impurities from which the gas component has been eliminated. Ozone containing impurities are caused to flow in from the inflow end (10*a*) of such a gas purification filter unit (10) and is passed through the first elimination unit (11) and second elimination unit (12), and thus ozone from which impurities have been eliminated is discharged from an outflow end (10*b*).

17 Claims, 4 Drawing Sheets

(51) Int. Cl.
*B01J 20/18* (2006.01)
*B01D 63/14* (2006.01)
*B01D 71/36* (2006.01)
*C01B 13/10* (2006.01)
*B01D 53/04* (2006.01)
*B01J 20/28* (2006.01)
*B01J 20/10* (2006.01)
*B01D 46/54* (2006.01)
*B01D 46/52* (2006.01)

(52) U.S. Cl.
CPC ............ *B01D 46/543* (2013.01); *B01D 53/02* (2013.01); *B01D 53/0407* (2013.01); *B01D 63/14* (2013.01); *B01D 71/36* (2013.01); *B01J 20/103* (2013.01); *B01J 20/18* (2013.01); *B01J 20/28004* (2013.01); *B01J 20/28019* (2013.01); *C01B 13/10* (2013.01); *B01D 2253/104* (2013.01); *B01D 2253/106* (2013.01); *B01D 2253/108* (2013.01); *B01D 2253/1085* (2013.01); *B01D 2253/304* (2013.01); *B01D 2253/308* (2013.01); *B01D 2256/14* (2013.01); *B01D 2257/60* (2013.01); *B01J 2220/66* (2013.01)

(58) Field of Classification Search
CPC ........ B01D 2253/304; B01D 2253/308; B01D 2256/14; B01D 2257/60; B01D 46/0002; B01D 46/0036; B01D 46/521; B01D 46/543; B01D 53/02; B01D 53/0407; B01D 63/14; B01D 71/36; B01J 20/103; B01J 20/18; B01J 20/28004; B01J 20/28019; B01J 2220/66; C01B 13/10
See application file for complete search history.

(56) References Cited

U.S. PATENT DOCUMENTS

| 6,723,154 | B2 | 4/2004 | Olsson et al. |
| 2009/0293717 | A1 | 12/2009 | Izumi et al. |
| 2011/0052483 | A1 | 3/2011 | Tabata et al. |
| 2014/0056794 | A1* | 2/2014 | Mori .................... B01D 53/685 423/241 |

FOREIGN PATENT DOCUMENTS

| JP | 2003-16638 A | 1/1991 |
| JP | H06 254574 A | 9/1994 |
| JP | 2009-142809 A | 6/1997 |
| JP | 2011-335102 A | 12/1999 |
| JP | 2001-176833 A | 6/2001 |
| JP | 2002-057136 A | 2/2002 |
| JP | 2009-066027 A | 4/2009 |
| JP | 2009-286683 A | 12/2009 |
| WO | WO 2009/069774 A1 | 6/2009 |

OTHER PUBLICATIONS

European Search Report for International Application No. EP 13 86 1626, entitled "Gas Purification Filter Unit," consisting of 6 pages, dated Jun. 20, 2016.
International Preliminary Report on Patentability for International Application No. PCT/JP2013/082961, "Gas Purification Filter Unit", Date of Completion: Sep. 8, 2014.
Chinese Search Report for Chinese Application No. 201380065040.8, "Gas Purification Filter Unit", dated: Apr. 1, 2016.

* cited by examiner

[Fig. 1]
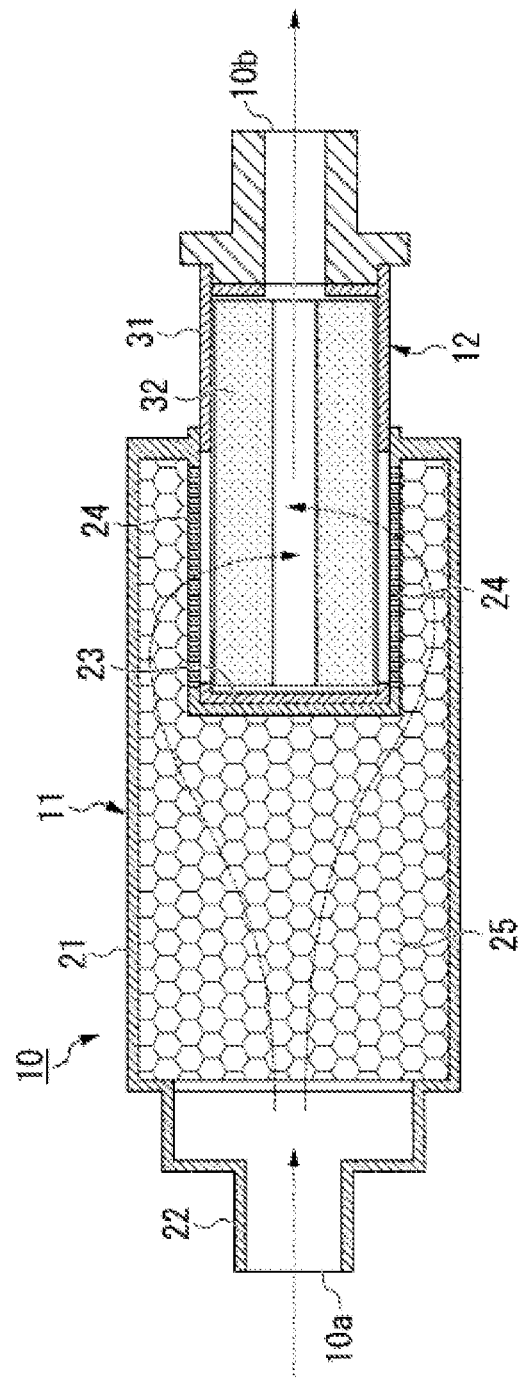

[Fig. 2A]
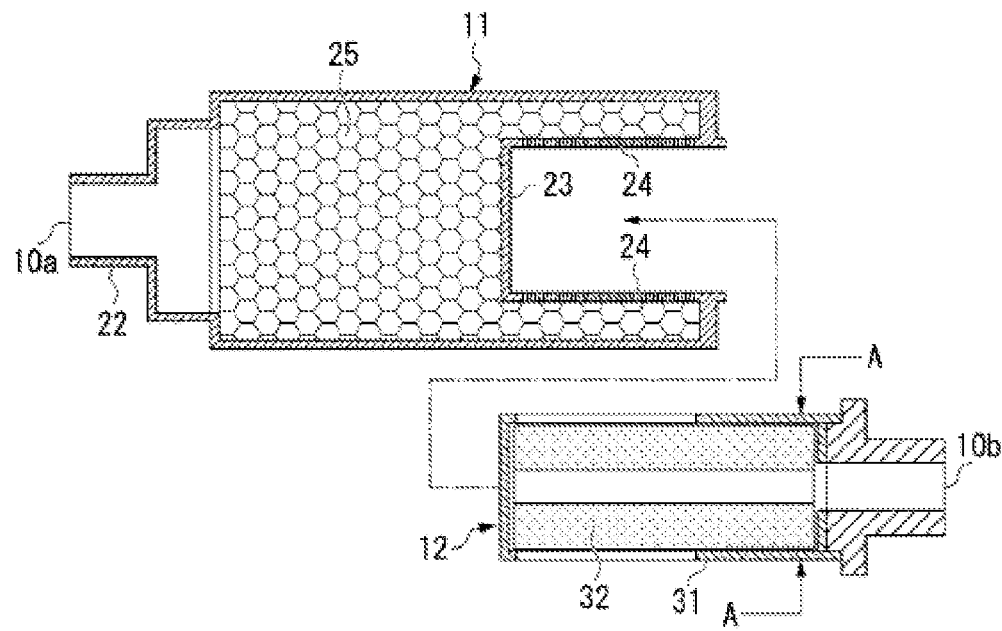
[Fig. 2B]
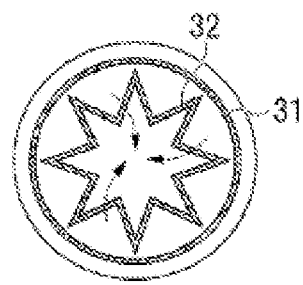

[Fig. 3]
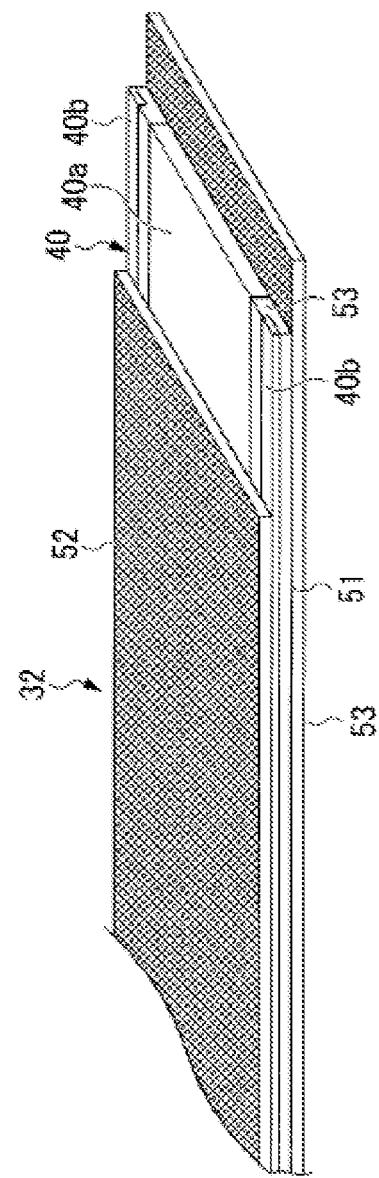

[Fig. 4]
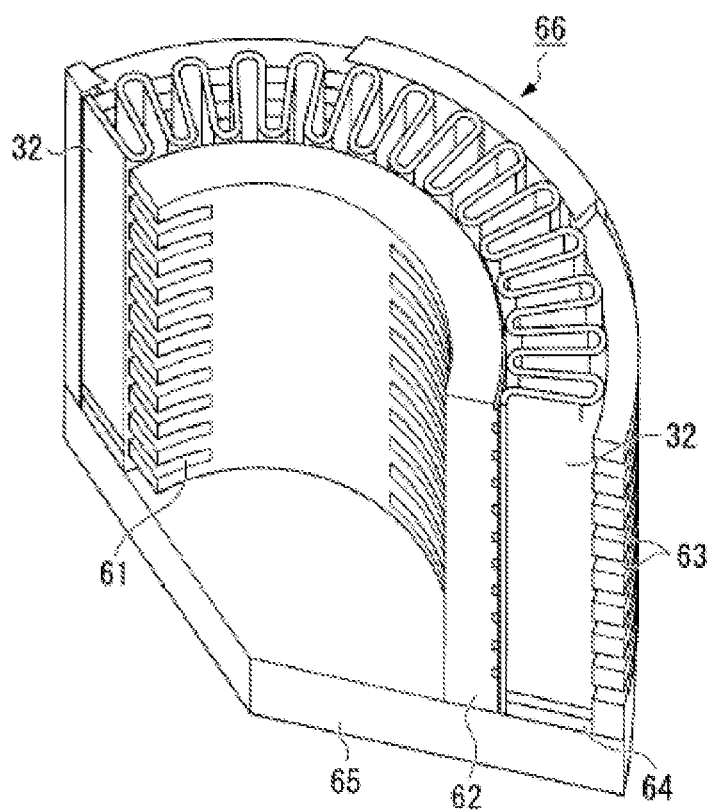

GAS PURIFICATION FILTER UNIT

RELATED APPLICATIONS

This application is the U.S. National Stage of International Application No. PCT/JP2013/082961, filed Dec. 9, 2013, published in Japanese, which claims priority to Japanese Application No. 2012-273367, filed Dec. 14, 2012.

TECHNICAL FIELD

The present invention relates to a gas purification filter unit, and more specifically the present invention relates to technology for removing impurities such as gas components and solid fine particles contained in ozone gas.

PRIOR ART

Ozone ($O_3$) is used in the production of semiconductor devices when there is a need for high oxidation capacity. Ozone may be used in a gaseous state, but it may also be dissolved in water for use as ozone water. An example of a case in which ozone is used in the gaseous state includes use for resist removal after etching treatment in a series of photolithography processes. A treatment means employing oxygen plasma has been used up until now for resist removal, but it is known that the use of oxygen plasma causes various problems, such as a deterioration in the tolerance of a gate oxide film of a semiconductor wafer, for example.

In this regard, a method in which ozone is blown at a resist surface in order to oxidize and degrade the resist has been proposed as a "damageless" resist removal method which does not cause any of this damage. A method in which ozone is blown in the presence of moisture has also been proposed in order to improve the degradation efficiency. For example, Patent Document 1 proposes a technique in which, when a series of treatments from resist removal up to washing/drying in a photolithography process are carried out using a single device, a thin liquid film of pure water is formed on the resist surface by means of water vapor supplied by means of a water vapor supply means, and ozone supplied by means of an ozone supply means is dissolved in this liquid film, whereby the resist is broken down into carboxylic acid, carbon dioxide and water etc.

Furthermore, Patent Document 2 indicates that a substrate is cleaned using ozone water. According to that proposal, ozone generated by an ozone generator and water for dissolving the ozone are placed next to each other, separated by a non-porous ozone gas-permeable polymer film for allowing the passage of gas alone while preventing the passage of water, and as a result ozone passes through the non-porous ozone gas-permeable polymer film in a pressurized state, unlike in the case where ozone is brought into direct contact with water, and high-concentration ozone water is cleanly generated without metal powders etc. derived from ozone generation being dissolved in the water.

However, concerns around contamination caused by impurities contained in the ozone, and in particular metal contamination, are a problem when ozone is used in a semiconductor device production process. Metals constituting a source of contamination that may be cited include electrode-derived metal which is produced when ozone is generated by silent discharge between electrodes, or reaction products from the reaction between ozone and metal pipes used as an ozone supply line or reaction products from reaction with nitrogen oxide generated as a by-product when ozone is produced. These metal impurities have a considerable effect on device performance, including electrical properties such as electrical conductivity, resistance and dielectric constant, for example. The metal impurities generally have higher conductivity than the material of the device so this has a profound effect on the properties at the Fermi level and as an individual charge carrier, even if the contamination only involves low concentrations of metal impurities. The effect of metal concentration on the electrical properties of many semiconductor materials is known from numerous documents.

A method in which ozone is supplied to a semiconductor device production process from an ozone generation source through a filter unit is known as a method for removing impurities from ozone which is used in a semiconductor production process or the like. In a conventional filter unit which is known in the art, an adsorbent for adsorbing impurities is used in order to remove gaseous impurities, for example. Furthermore, it is also known to strain impurities in the form of solid fine particles using a sheet-like filtration material or the like. At the same time, electrode structures and electrode materials for performing silent discharge in an ozone generator are also being improved so that ozone is generated with fewer metal impurities.

PRIOR ART DOCUMENTS

Patent Documents

Patent Document 1: JP 2001-176833 A
Patent Document 2: JP 2002-057136 A

SUMMARY OF THE INVENTION

Problem to be Solved by the Invention

However, the only filter units for removing impurities from ozone which are known in the prior art are mainly those which are intended to remove gaseous impurities or those which are intended to remove impurities in the form of solid fine particles, and a filter unit for efficiently removing both gaseous impurities and impurities in the form of solid fine particles contained in ozone would be desirable.

Furthermore, it is difficult to reduce the amount of metal impurities contained in generated ozone to a level at which the semiconductor device production process is uncontaminated simply by improving the electrode structure and electrode material in the ozone generator.

The present invention has been devised in view of the conventional situation described above, and the aim thereof lies in providing a gas purification filter unit which can efficiently remove both gaseous impurities and impurities in the form of solid fine particles contained in ozone, and can also supply ozone which does not contaminate a semiconductor device production process.

Means for Solving the Problem

In order to solve the abovementioned problem, several modes of the present invention provide a gas purification filter unit such as that described below.

That is to say, a gas purification filter unit according to the present invention removes impurities contained in ozone gas and is characterized in that it is provided with a first removal section for removing a gas component from the impurities, and a second removal section which is disposed at a stage after the first removal section and removes solid fine particles from impurities from which the gas component has been removed.

The gas purification filter unit is characterized in that the first removal section is provided with an adsorbent for adsorbing the gas component.

The gas purification filter unit is characterized in that the adsorbent is silica gel.

The gas purification filter unit is characterized in that the silica gel has a large number of pores, the diameter of the respective pores being no greater than 10 nm.

The gas purification filter unit is characterized in that the silica gel is in the form of spheres having a diameter of between 0.5 mm and 3 mm.

The gas purification filter unit is characterized in that the adsorbent includes silica and alumina.

The gas purification filter unit is characterized in that the adsorbent comprises a high-silica zeolite in which the proportion of silica is at least 10 times that of alumina.

The gas purification filter unit is characterized in that the second removal section is provided with an area for straining the solid fine particles.

The gas purification filter unit is characterized in that the second removal section comprises a resin case which is resistant to ozone corrosion, and the abovementioned area which is accommodated inside the resin case.

The gas purification filter unit is characterized in that the abovementioned area is a filtration material in the form of a sheet which is folded for accommodation inside the resin case.

The gas purification filter unit is characterized in that the filtration material has a nominal pore size ranging between 0.2 μm and 0.5 μm.

The gas purification filter unit is characterized in that the resin case and the filtration material comprise a fluororesin.

The gas purification filter unit is characterized in that the fluororesin comprises at least one from among: tetrafluoroethylene-hexafluoropropylene copolymer, polytetrafluoroethylene and perfluoroalkoxy fluororesin.

The gas purification filter unit is characterized in that the first removal section is provided with an external covering for accommodating the adsorbent, and an accommodation section which is formed on part of the external covering and can detachably accommodate the resin case forming part of the second removal section.

The gas purification filter unit is characterized in that the accommodation section is provided with a mesh member made of stainless steel.

Advantage of the Invention

The gas purification filter unit according to the present invention comprises a first removal section for removing, from among impurities contained in ozone generated by means of an ozone generator, gas-component impurities, and a second removal section which is disposed at a stage after the first removal section and further removes impurities in the form of solid fine particles from the impurities from which the gas component has been removed; as a result it is possible to efficiently remove both gaseous impurities and impurities in the form of solid fine particles which are contained in ozone generated by an ozone generator.

If a gas purification filter unit having the structure described above is inserted as an in-line filter between an ozone generator and a semiconductor device production process, for example, it is possible to supply high-purity ozone with very few metal impurities to an ozone treatment process in the production of a semiconductor device and it is possible to reduce concerns around contamination of the semiconductor device with heavy metals etc.

BRIEF DESCRIPTION OF THE FIGURES

FIG. 1 is a view in cross section showing a gas purification filter unit according to a mode of embodiment of the present invention.

FIG. 2A is a view in cross section showing the situation when the second removal section has been removed from the first removal section in the gas purification filter unit according to a mode of embodiment of the present invention.

FIG. 2B is a schematic view in cross section of the second removal section in the gas purification filter unit according to a mode of embodiment of the present invention.

FIG. 3 is a main-part oblique cutaway view showing the structure of the filtration material which is preferably used in the second removal section.

FIG. 4 is a main-part oblique cutaway view showing the filtration material when it is accommodated.

MODE OF EMBODIMENT OF THE INVENTION

A mode of embodiment of the gas purification filter unit according to the present invention will be described below with reference to the figures. It should be noted that this mode of embodiment is intended to provide a specific description in order to improve an understanding of the essential point of the invention and does not limit the present invention unless specifically stated otherwise. Furthermore, for the sake of convenience, the portions constituting the main parts in the figures used in the following description are sometimes enlarged in order to aid comprehension of the features of the present invention, and what is depicted may not necessarily be the same as the dimensional proportions etc. of the constituent elements.

FIG. 1 is a view in cross section showing a gas purification filter unit according to this mode of embodiment.

A gas purification filter unit 10 is used to purify ozone (ozone gas) which is used in a semiconductor device production process, and may be used as an in-line filter which is inserted partway along a pipe for supplying ozone between an ozone generator and the semiconductor device production process.

The gas purification filter unit 10 is provided with a first removal section 11 for removing, from among impurities contained in ozone generated by means of an ozone generator, gas-component impurities, and a second removal section 12 which is disposed at a stage after the first removal section 11 and further removes impurities in the form of solid fine particles from the impurities from which the gas component has been removed. The ozone containing impurities is made to flow from an inflow end 10a of the gas purification filter unit 10 and is made to flow through the first removal section 11 and second removal section 12, and ozone from which impurities have been removed is discharged from an outflow end 10b as a result (see the dotted arrow in FIG. 1).

One end of the first removal section 11 comprises the inflow end 10a for when ozone containing impurities generated by an ozone generator is introduced into the gas purification filter unit 10. The first removal section 11 is provided with an external covering 21 having a substantially cylindrical outer shape. The external covering 21 is formed from a material which is resistant to the oxidative power of ozone and is very strong, e.g. stainless steel. A connector 22 which narrows in such a way as to have a predetermined opening diameter is formed at one end of the external covering 21 in order to connect a pipe which is joined to the ozone generator.

An accommodation section 23 for detachably accommodating the second removal section 12 is formed at the other end of the first removal section 11. A cylindrical space is formed in this accommodation section 23 in such a way as to enable the second removal section 12, which has a substantially cylindrical external shape, to be received therein. A mesh member 24 comprising stainless steel which is resistant to ozone is provided in the accommodation section 23. The mesh member 24 allows ozone that has passed through the first removal section 11 to flow into the post-stage second removal section 12.

The inside of the external covering 21 which forms part of the first removal section 11 is filled with an adsorbent 25 for physically adsorbing or chemically adsorbing and removing gas-component impurities from the impurities contained in the ozone generated by the ozone generator. One end of the external covering 21 preferably has a structure which can be opened/closed in such a way that the adsorbent 25 can be easily replaced.

A purification material for removing metal compounds from ozone gas is used as the adsorbent 25. When ozone containing impurities is brought into contact with the adsorbent 25, the gas-component impurities are reduced to a low level. As a result of ozone containing impurities passing through the first removal section 11, the total metal contamination of the gas component in the ozone is reduced to less than 100 ppt by volume, preferably less than 10 ppt by volume, and more preferably less than 1 ppt by volume.

The purification material which is used as the adsorbent 25 is a high-surface-area inorganic oxide that does not contain any transition metal elements and has an ozone decomposition catalytic action, for example. A number of purification materials are understood to bring about metal removal in the method according to the present invention. An example of a purification material which is used as the adsorbent 25 that may be mentioned is a high-surface-area inorganic compound containing high-silica zeolite having a Si/Al ratio of about four or greater. High-silica zeolite having a $SiO_2/Al_2O_3$ ratio of 10 or greater should preferably be used. Furthermore, it is also important that said compound contains very little in the way of heavy metals or does not contain heavy metals.

The purification material which is used as the adsorbent 25 preferably has a surface area exceeding about 20 $m^2/g$, and more preferably exceeding about 100 $m^2/g$, but a larger surface area is still permissible. The surface area of the material must take account of the surface area of both the inside and the outside. The surface area of the purification material may normally be measured in accordance with industry standards using the Brunauer-Emmett-Teller method (BET method).

In simple terms, the BET method involves measuring the amount of adsorption gas (e.g., nitrogen, krypton) or adsorbate required to cover the external surface and contactable internal pore surface of a solid with a complete single-molecule layer of adsorbate. The volume of the single-molecule layer can be calculated from the adsorption isotherm using the BET equation, and the surface area can then be calculated from the volume of the single-molecule layer using the dimensions of the molecules of adsorbate.

The type of metal oxide employed for the purification material which can be used as the adsorbent 25 is not limited to what has been described above, and silicon oxide, aluminum oxide, aluminosilicate oxide (sometimes referred to as zeolite) and titanium oxide are included.

In a preferred mode of embodiment, the purification material is provided in the external covering 21 which is resistant to chemical and physical deterioration caused by ozone. For example, high-purity stainless steel such as 316L having a minimum surface roughness of 0.2 ra or similar makes an especially preferable external covering 21 vessel. For certain modes of embodiment employing gases which are corrosive, oxidative or reactive in other states, the vessel is selected from materials which are stable under operating conditions.

Silica gel is preferably cited as a purification material which can be used as the adsorbent 25 in addition to the abovementioned silica zeolite.

Silica gel is a material in which an acid component obtained from an aqueous solution of sodium metasilicate ($Na_2SiO_3$) is hydrolyzed, and the resulting silicic acid gel is dewatered and dried.

An example of the silica gel which fills the external covering 21 of the first removal section 11 that may be mentioned is silica gel in the form of spheres having a diameter of between 0.5 mm and 3 mm. Furthermore, the silica gel which is used preferably has a large number of pores, the diameter of the respective pores being no greater than 10 nm, from the point of view of adsorption power.

The silica gel is a substance which absorbs moisture, as is known, but there are concerns regarding a reduction in the capacity to remove metal compounds when the moisture content of the silica gel increases. This is because moisture is adsorbed first by the pores in the silica gel which adsorbs metal compounds. The silica gel used as the adsorbent 25 is therefore preferably controlled beforehand in such a way that a suitable amount of moisture is not exceeded.

When silica gel is used as the adsorbent 25, it is possible to efficiently remove metal compounds with respect to high-level ozone. With the abovementioned silica zeolite, there is a possibility of ozone decomposition progressing and of adsorbed metal compounds being released again due to heat generated by the heat of decomposition when high-level ozone of several tens of $g/m^3$ or greater is passed through. However, ozone decomposition can be suppressed by using silica gel as the adsorbent 25 and metal compounds can be reliably adsorbed from low-level ozone of several $g/m^3$ or less up to high-level ozone of several tens of $g/m^3$ or greater.

A Teflon®-based or lined material is preferably used as the external covering 21 in several modes of embodiment. In terms of the flow line for various normal gas flows, the external covering 21 normally handles a gas flow rate in the range of about 1-300 standard liters of gas/minute (slm) and has a required average lifespan of up to 24 months. The external covering 21 can preferably cope with an ozone temperature in the range of −80° C. to +100° C. The maximum inlet pressure to the external covering 21 at the inflow end 10a is normally in the range of about 0 psig to 3000 psig (20,700 kPa). For example, a cylindrical external covering 21 having a diameter in the range of about 3-12 inches (6-25 cm) and a length of 4-24 inches (8-60 cm) is preferred. The ozone must have a sufficient residence time within the adsorbent 25 in order to remove the metal contaminants down to a level below 100 ppt, so the dimensions of the external covering 21 are dependent on the flow rate and volume of ozone, the activity of the purified material, and the amount of impurity to be removed.

FIG. 2A is a view in cross section showing the situation when the second removal section has been removed from the first removal section forming part of the gas purification filter unit, and FIG. 2B is a schematic view in cross section of the second removal section along the line A-A in FIG. 2A.

The second removal section 12 which is accommodated in such a way as to be detachable from the post-stage side of the first removal section 11, i.e. the accommodation section 23 of the first removal section 11, comprises: a substantially cylindrical resin case 31 which is resistant to ozone corrosion; and a filtration material (area) 32 for straining solid fine particles, from the impurities contained in the ozone.

The filtration material (area) 32 comprises a sheet-like filter material which should be folded into a flower-shaped or pleated form in order to increase the exposed surface area, and then accommodated inside the resin case 31. Furthermore, the resin case 31 comprises a material which is very resistant to corrosion by ozone which has strong oxidative power, e.g. a fluororesin. Particularly preferred fluororesins which may be cited include: tetrafluoroethylene-hexafluoropropylene copolymer (FEP), polytetrafluoroethylene (PTFE) and perfluoroalkoxy fluororesin (PFA).

One end of the second removal section 12, that is, the portion facing the mesh member 24 formed in the accommodation section 23 of the first removal section 11, constitutes an inflow side which receives as inflow ozone from which gas-component impurities have been removed by means of the first removal section 11. Furthermore, the other end thereof forms an outflow end 10b which allows an outflow of high-purity ozone gas from which solid fine particles have been strained by means of the second removal section 12, toward a semiconductor device production process or the like.

Examples of the filtration material 32 for straining the solid fine-particle impurities which may be cited include a woven fabric, a nonwoven fabric, a molded article and a mesh. A woven fabric filter may be formed by weaving fibers, or it may be formed by intertwining fibers to produce twisted yarns which are then woven. In addition, particles which adsorb heavy metals that affect the semiconductor device production process are also preferably woven into the twisted yarns.

A nonwoven fabric filter may be formed by using a known method to entwine fibers cut to a length of between several mm and several cm, for example. It is also possible to entwine multiple types of fibers. A molded-article filter may be obtained by using a known molding method to mold, into any form, fibers cut to a length of between several mm and several cm, for example. A mesh filter may be formed by knitting fibers into a mesh. It should be noted that particles which adsorb heavy metals that affect the semiconductor device production process are also preferably bonded to these fibers.

The size between open portions of the fibers in the material used as the filtration material 32 affects the trapping performance, but the nominal pore size for this performance preferably ranges between 0.2 µm and 0.5 µm. If the nominal pore size of the filtration material 32 is less than 0.2 µm, the difference in pressure between the inflow side and the outflow side of the filtration material 32 is excessively large and there are concerns regarding ozone decomposition. On the other hand, if the nominal pore size of the filtration material 32 is larger than 0.5 µm, this risks affecting the likelihood of particles of heavy metals, which affect the semiconductor device production process, being strained.

An example of a method for producing a porous PTFE film (filtration membrane) which can be suitably used as the filtration material 32 will be described below. As shown in FIG. 3, a non-porous edge film 51 made of a thermoplastic fluororesin is thermo-compression bonded using a heat roll heated to 200° C. or more on both edges 40b of a hydrophobic porous PTFE film 40, after which the assembly is sandwiched between support nets 52, 53 comprising a thermoplastic fluororesin forming fluid passages for supply liquid and filtrate. The support nets have the role of supporting the porous PTFE film which is very soft and sags easily.

It should be noted that in this case the "thermoplastic fluororesin" is a thermoplastic fluororesin or the like selected from the following compounds which melt as a result of heating: tetrafluoroethylene-perfluoroalkyl vinyl ether copolymer (PFA), tetrafluoroethylene-hexafluoropropylene copolymer (FEP), and tetrafluoroethylene-perfluoroalkyl vinyl ether copolymer-hexafluoropropylene copolymer (EPE). When PTFE is used as the hydrophobic porous film and this is thermally bonded to a fluororesin member, it is necessary to use a thermoplastic fluororesin as the edge film. The edge film need not be used when a film other than PTFE is used as the hydrophobic porous resin film. A filtration material 32 which is suitable for the second removal section 12 can be obtained by means of the abovementioned process.

The filtration material 32 comprising a laminated body having a structure such as that shown in FIG. 3 is alternately folded in opposite directions to form pleats, and both edges are placed one over the other and thermally bonded to form an endless structure which can be used in this mode of embodiment. As shown in FIG. 4, for example, the filtration material 32 is inserted between a porous outside sleeve 64 having pores 63 and a porous inside core 62 made of a thermoplastic fluororesin having pores 61, the upper and lower edges of the edge film and support nets are sealed by an end cap 65 made of a thermoplastic fluororesin, and a filter element (second removal section) 66 can be obtained as a result.

As described above in detail, the gas purification filter unit 10 according to this mode of embodiment comprises a first removal section 11 for removing, from among impurities contained in ozone generated by means of an ozone generator, gas-component impurities, and a second removal section 12 which is disposed at a stage after the first removal section 11 and further removes impurities in the form of solid fine particles from the impurities from which the gas component has been removed; as a result it is possible to efficiently remove both gaseous impurities and impurities in the form of solid fine particles which are contained in ozone generated by an ozone generator.

If the gas purification filter unit 10 having the structure described above is inserted as an in-line filter between an ozone generator and a semiconductor device production process, for example, it is possible to supply high-purity ozone with very few metal impurities to an ozone treatment process in the production of a semiconductor device and it is possible to reduce concerns around contamination of the semiconductor device with heavy metals etc.

Exemplary Embodiment

The capacity for adsorbing metal components using the gas purification filter unit according to the present invention was measured in order to confirm the advantage of the present invention.

In order to make the abovementioned confirmation, an apparatus configuration was adopted in which a filter unit was connected to a high-level ozone generator by way of a stainless steel pipe and metal components contained in outflow gas from the filter unit were measured.

As an example of the present invention, use was made of the gas purification filter unit 10 shown in FIG. 1, which was provided with the first removal section 11 and second removal section 12, and the first removal section 11 was filled with silica gel as the adsorbent 25. The silica gel which was used was in the form of spheres having a diameter of 1-3 mm, the pore diameter was 1-10 nm, and the silica gel was preheated and dried.

Meanwhile, as a comparative example, the first removal section 11 was excluded from the abovementioned gas purification filter unit 10 so that it comprised only the second removal section 12.

The gas introduced was high-level ozone gas of several tens of $g/m^3$ or greater, and stainless steel was used for the pipe. Fe, Cr and Mn were included as metal components in the stainless steel pipe which would be a source of contamination.

Atomic absorption spectroscopy was used as the method for measuring the concentration of metal components. Outflow gases from the inventive example and the comparative example were released by bubbling into pure water and the resulting test solutions were compared, whereby the metal components (Fe, Cr, Mn) contained in the outflow gases of the inventive example and the comparative example were measured.

The results of this confirmation are shown in table 1. It should be noted that the concentration on the gas supply side in the table denotes the metal concentration on the supply side of ozone gas generated by an ozone generator, in other words the metal concentration in ozone gas before passage through the stainless steel pipe.

TABLE 1

|  | Fe | Cr | Mn |
| --- | --- | --- | --- |
| Inventive Example | 0.03 | 0.01 | 0.03 |
| Comparative Example | 0.05 | 2.68 | 0.69 |
| Concentration on gas supply side | 0.01 | 0.18 | 0.04 |
|  |  |  | (ppb) |

According to the results of the confirmation, the concentration of metal components in ozone gas that had passed through a gas purification filter unit employing silica gel as the adsorbent for the first removal section 11 showed that 99% or more Cr and 95% or more Mn had been removed, compared with the comparative example using only the second removal section 12 without the first removal section 11. It was confirmed that by using the gas purification filter unit according to the present invention which can remove Cr and Mn with high precision, it is possible to reliably prevent metal contamination even when ozone is used in a semiconductor device production process.

KEY TO SYMBOLS

10 . . . Gas purification filter unit, 11 . . . First removal section, 12 . . . Second removal section, 23 . . . Accommodation section, 25 . . . Adsorbent, 31 . . . Resin case, 32 . . . Filtration material.

The invention claimed is:

1. A gas purification filter unit for removing impurities contained in ozone gas, comprising:
a first removal section for removing a gas component from the impurities, and a second removal section which is disposed at a stage after the first removal section and removes solid fine particles from impurities from which the gas component has been removed, said gas purification filter unit comprises an accommodation section for detachably accommodating the second removal section, said accommodation section is formed at the end of the first removal section and includes a cylindrical space formed therein to enable the second removal section, which has a substantially cylindrical external shape, to be received therein.

2. The gas purification filter unit as claimed in claim 1, wherein the first removal section is provided with an adsorbent for adsorbing the gas component.

3. The gas purification filter unit as claimed in claim 2, wherein the adsorbent is silica gel.

4. The gas purification filter unit as claimed in claim 3, wherein the silica gel has a large number of pores, the diameter of the respective pores being no greater than 10 nm.

5. The gas purification filter unit as claimed in claim 3, wherein the silica gel is in the form of spheres having a diameter of between 0.5 mm and 3 mm.

6. The gas purification filter unit as claimed in claim 2, wherein the adsorbent includes silica and alumina.

7. The gas purification filter unit as claimed in claim 6, wherein the adsorbent comprises a high-silica zeolite in which the proportion of silica is at least 10 times that of alumina.

8. The gas purification filter unit as claimed in claim 1, wherein the second removal section is provided with an area for straining the solid fine particles.

9. The gas purification filter unit as claimed in claim 8, wherein the second removal section comprises a resin case which is resistant to ozone corrosion, and the area which is accommodated inside the resin case.

10. The gas purification filter unit as claimed in claim 9, wherein the area is a filtration material in the form of a sheet which is pleated for accommodation inside the resin case.

11. The gas purification filter unit as claimed in claim 10, wherein the filtration material has a nominal pore size ranging between 0.2 μm and 0.5 μm.

12. The gas purification filter unit as claimed in claim 9, wherein the resin case and the filtration material comprise a fluororesin.

13. The gas purification filter unit as claimed in claim 12, wherein the fluororesin comprises at least one from among: tetrafluoroethylene-hexafluoropropylene copolymer, polytetrafluoroethylene and perfluoroalkoxy fluororesin.

14. The gas purification filter unit as claimed in claim 9, wherein wherein the first removal section is provided with an external covering for accommodating the adsorbent, and an accommodation section which is formed on part of the external covering and can detachably accommodate the resin case forming part of the second removal section.

15. The gas purification filter unit as claimed in claim 14, wherein the accommodation section is provided with a mesh member made of stainless steel.

16. The gas purification unit according to claim 1, wherein said first and second removal portions for an integral construction in which both removal sections are continuously arranged so as to be adjacent to each other.

17. The gas purification filter unit as claimed in claim 1, wherein the first removal section is provided with an adsorbent for adsorbing the gas component, said adsorbent does not contain transition metal elements.

* * * * *